April 9, 1974   J. MEGIAS   3,803,276
METHOD FOR BENDING THERMOPLASTIC PIPES
Filed April 13, 1971   2 Sheets-Sheet 1
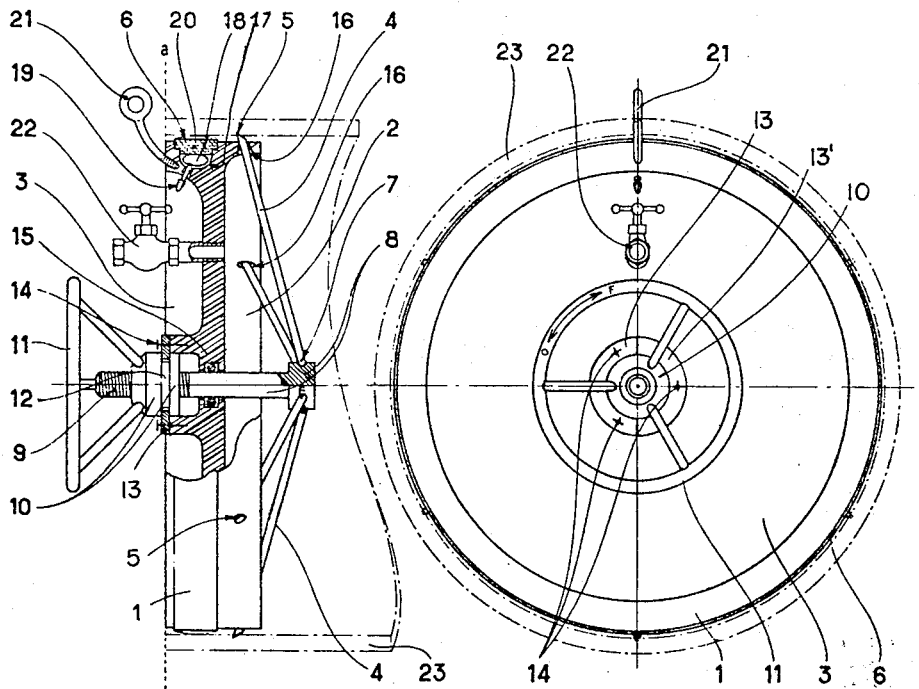
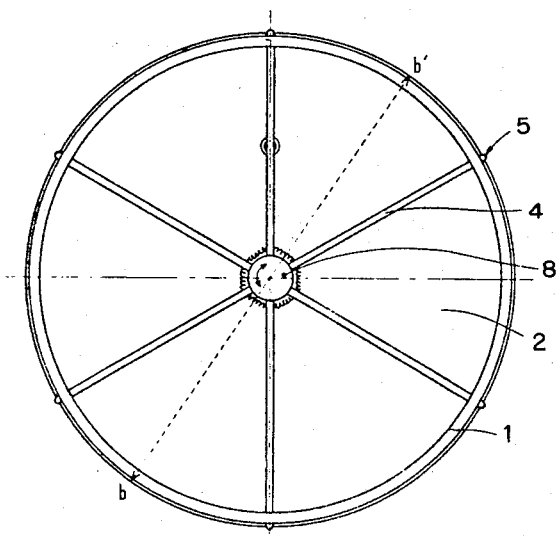
INVENTOR
JOSEPH MEGIAS
ATTORNEYS United States Patent Office 3,803,276
Patented Apr. 9, 1974

3,803,276
METHOD FOR BENDING THERMOPLASTIC PIPES
Joseph Megias, Toulouse, France, assignor to
Tomecap S.A., Toulouse, France
Filed Apr. 13, 1971, Ser. No. 133,541
Claims priority, application France, Apr. 13, 1970,
7013679
Int. Cl. B29c 17/02
U.S. Cl. 264—34         8 Claims

ABSTRACT OF THE DISCLOSURE

Process for bending to the desired shape pipes made out of thermoplastic material, in particular pipes having a large cross section and a substantial wall thickness.

Both ends of the pipe to be bent are sealed by tight joints, and heated to create an autogeneous pressure in the pipe to prevent kinking during subsequent bending and one or both ends of the pipe made plastic by the heating step are pulled in the vertical symmetry plane up to obtaining the desired curve.

---

The present invention relates to a process for bending to the desired shape pipes made out of thermoplastic material. More specially, the process of the invention can be applied to pipes having a large cross section, for example from 200 to more than 550 square millimeters, and a substantial wall thickness possibly exceeding 10 millimeters, the bending of such pipes being till now very difficult, and most often impracticable.

Another object of the invention is a device for carrying out the bending process, the realization and use of which is particularly simple. This device has also the advantage of being very light which makes it possible to use not only in workshops, but also on site even where access is difficult.

It is well known that when bending a pipe of a thermoplastic material, such as polyvinyl chloride or polyethylene, heated to its plasticity temperature, pleats are usually formed in the area of compression at the concave part of the bend while the convex part in the expansion zone tends to flatten. These deformations are unacceptable, mainly when pipes are provided for fluids flowing at high speed, and which require uniform continuous bends and internal walls which are perfectly smooth.

The purpose of the present invention is to remedy these drawbacks heretofore observed in the bending of large thermoplastic pipes to the desired shape. The invention can be advantageously applied to the economical realizations of systems for water collecting and supply to hydroelectric pools, specially when these systems have to be located in places difficult of access, and requiring that the pipes take the exact shape of the ground according to the profile of the latter. Such pipes suitable for transporting water must necessarily be nonhygroscopic.

According to the process of the invention, both ends of the pipe to be bent are sealed by means of removable and tight joints; the tubular element is heated uniformly through the whole of the length to be curved to the required plasticity, thereby creating an autogenous pressure in the pipe; one or both ends of the pipe made plastic by heating are pulled in the vertical symmetry plane of the pipe up to obtaining the length of geometric chord corresponding to the desired bend; then the latter is cooled while under stress in order to bring it back to its initial stiffness.

During the heating period the expansion of the fluid confined in the pipe develops an autogenous pressure which must be regulated to a given value depending on the nature of the constituent material, the section, the wall thickness and the length of the tubular element. The optimum value of the pressure is easily determined in each case by the man skilled in the art. If required, the pressure is regulated by partial expansion of the confined fluid, or on the contrary by the addition of a supplementary quantity of compressed fluid. The fluid most often used is air, but in some cases it is advisable to use fluids having particular characteristics such as nitrogen, carbon dioxide or other gaseous fluids, alone or mixed, preheated or not. Due to the pressure maintained in the pipe during the bending operation, any pleating is avoided on the internal curvature, and a perfectly uniform bending is obtained.

The bending operation itself is carried out in a very simple manner. One or both of the ends of the pipe made plastic by heating are pulled in the plane of vertical symmetry of the pipe, the vertical component of the traction force being less than the weight of the tubular element provided with tight joints. In some cases, it is particularly advantageous to predetermine the length of the geometric chord to the value corresponding to the desired final curve so that the bending can be effected very rapidly and safely.

When the desired curvative is reached, the pipe is cooled down to the temperature where the thermoplastic material is back to its normal stiffness, by means of a rapid cooling, for instance sprinkling with cold water. The sealing joints are removed from the tubular element after cooling down to room temperature, and lowering the internal pressure to atmospheric pressure.

The device for carrying out the process of the invention comprises essentially two terminal removable joints for sealing tightly both ends of the pipe during the heating, bending and cooling operations and optionally a system of variable spacing, adjustable to a given minimum length, the ends of which are rigidly attached to the pipe ends during bending and cooling.

Both sealing joints are made out of a material which must remain strictly rigid at the temperatures used during the initial heating of the pipe and preferably of a light metal or alloy such as aluminum, duraluminum etc. . . At least one of these joints is provided with a valve or any other similar device to permit the internal volume of the pipe (closed at its two ends by sealing joints), to be in communication with ambient air or with a source of compressed fluid at the desired time. One of these joints can also be provided with a device to measure and indicate the value of the autogenous internal pressure and/or a safety system such as a valve or an explosion joint tested at a pressure higher than the pressure required during bending and lower than the pressure which would cause the explosion of the pipe under the operating conditions.

The sealing joints to be used in the process of the invention can be of different forms according to how they must be fitted onto the ends of the pipe to be bent or encased into these ends. In all cases, the joints are provided with a withdrawable anchor-system, external or internal, in order that they remain rigidly attached to the pipe during the elevation of the pressure caused by heating and the adjustment of this pressure, as well as means for assuring the tightness of the whole.

The system of adjustable spacing is removably attached to the ends of the pipe so that it can be placed as soon as the thermal treatment is ended. Preferably, the attachment of the pipe is realized through the sealing joints which for this purpose are provided with lifting brackets. This adjustable system permits the length of the geometric chord to be fixed to the desired curvative. The system can be, for example, a rack-rod or a sliding-rod, the initial length of which is substantially equal to the distance between its attachment points on the linear pipe, and the final length being that of the geometric chord corresponding to the arc formed by the internal curvature of the pipe.

The following description with reference to the annexed schematic drawings is given for illustrating the invention by showing a preferred embodiment of the device for performing the process of the invention.

FIG. 1 represents a diametrical section of a sealing joint placed at one of the ends of the pipe to be bent, the joint being level with the pipe in aa'.

FIGS. 2 and 3 represent respectively the external and internal faces of the sealing joint shown in FIG. 1.

Figure 4:
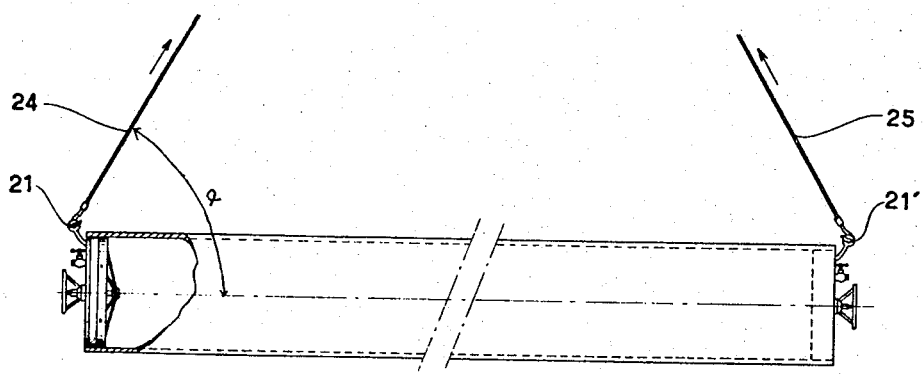
FIGS. 4, 5 and 6 show schematically the bending process itself, FIG. 6 illustrating more particularly the working of the system of adjustable spacing.

The sealing joint 1 comprises a disc with a cylindrical rim, made out of light metal alloy, the diamter bb' of the disc (FIG. 3) being slightly less than the internal diameter of the pipe 23 in which it enters freely. The recesses 2 and 3 (FIG. 1) are provided to lighten the joint as far as possible. The joint 1 comprises, on one hand, a radial anchor-system provided with six arms in order to maintain it within pipe 23 by means of outgoing lugs 5 and, on the other hand, an inflatable device 6 assuring the tightness of the whole.

The anchor-system is constituted by six radial arms 4, the peripheral bevelled end 5 of each arm taking the part of forcing the lugs 5 into the internal face of the pipe, the other end being mounted in 7 on axle 8. The latter screwed in 9 is fitted in the rotary nut 10 driven by wheel 11. A circular groove 12 is provided in rotary nut 10 in order to secure the latter to sealing joint 1 by means of an annular flange 13, 13' (FIG. 2) which penetrates into it and is fixed to joint 1 by screws 14. A packing joint 15 assures the tightness around axle 8.

When joint 1 is placed into the pipe to be bent, the rotation of wheel 11 moves axle 8 toward the exterior of the pipe forcing bevelled ends 5 to become embedded into the internal wall by the clearance of radial arms 4 sliding into openings 16 provided in the rim of joint 1.

The rim of sealing joint 1 comprises an external annular groove 17 for the placement of the tightening system 6. The latter is constituted by an inner tube 18 provided with an inflating valve 19 and placed in the bottom of annular groove 17, an elastomer ring 20 being forced into the higher part of this groove on inner tube 18 in order to be level with the rim. The inflating of inner tube 18 applies the ring 20 on the internal wall of pipe 23 to be bent, thereby assuring the tightness of the whole by sealing the annular space initially present between joint 1 and pipe 23.

In addition, sealing joint 1 is provided with a pulling ring 21, a valve 22 crossing the cheek of the joint to get pipe 23 into communication with the atmosphere, or with a source of gas, as well as a safety valve, and optionally a pressure-gauge not represented in FIGS. 1 and 2.

While the sealing joint 1 is being placed into pipe 23 to be bent, the bevelled lugs of anchor-arms 4 are level with the external cylindrical face of the rim. Inner tube 18 being deflated, plastic ring 20 has substantially the same external diameter as the rim. At this first step valve 22 is closed.

Both sealing joints 1 being fixed to the ends of the pipe by anchoring, the whole is heated progressively and uniformly so that the part to be bent of the thermoplastic material is heated to its plasticity temperaure. Such a thermal treatment is advantageously carried out in a tunnel-furnace coaxial with the tubular element, heated by hot gases or comprising a gas-tap, a good distribution of heat being assured during the operation by continuously rotating the pipe, on rollers for example.

The internal pressure is regulated to the required value by correcting the autogenous pressure either by partial expansion or addition of supplemental compressed fluid by means of valve 22.

As an example it can be indicated that for bending by lifting a pipe constituted by a section of cylindrical tube made out of polyvinyl chloride having a length of 4 m., a section of 530–550 square mm. and a thickness of 10 mm., heating is regulated in order to raise the temperature of the mass to 145±5° C., and the autogenous internal pressure is adjusted 165±15 g./cm.$^2$.

The pipe made plastic and ready for bending is then removed from the heating enclosure by lateral translation on a horizontal cradle not represented in the figures.

Figure 5:
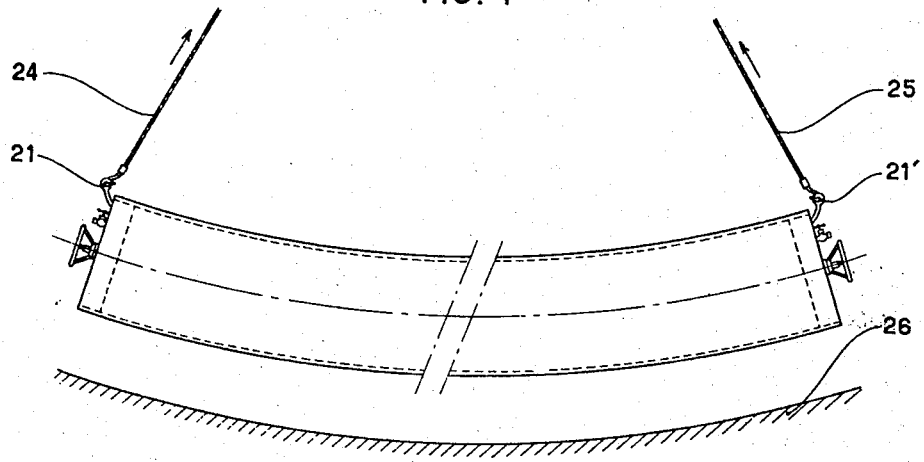

The ends 24 and 25 of the two cables guided by a set of pulleys placed above the pipe and not represented are fixed respectively to pulling rings which are attached to the symmetrical sealing joints. By exerting a pulling action on the free ends of the cables, the pipe is bent progressively till the curve reaches that of profile 26 (FIG. 5) used as a pattern. The choice of angle α, that is of the angle between the direction of pull and the pipe axis (FIG. 4), regulates the thickness of the pipe walls in the area of curvature, too large angle α tending to make the walls thinner. The man skilled in the art can easily determine in each case according to the material used, the treatment temperature and the desired profile, the value of angle α for which the final wall thickness is at least equal to the initial thickness.

In some cases, specially when the bending operation has to be effected very rapidly, for instance when there is only a small difference of temperature between the temperatures of plasticity and stiffness of constituent material, or when the ambient temperature is low enough to bring back the latter too rapidly to its initial stiffness, it is particularly advantageous to use a system for fixing in advance the final distance between lifting rings 21 and 21' on the bent pipe.

Figure 6:
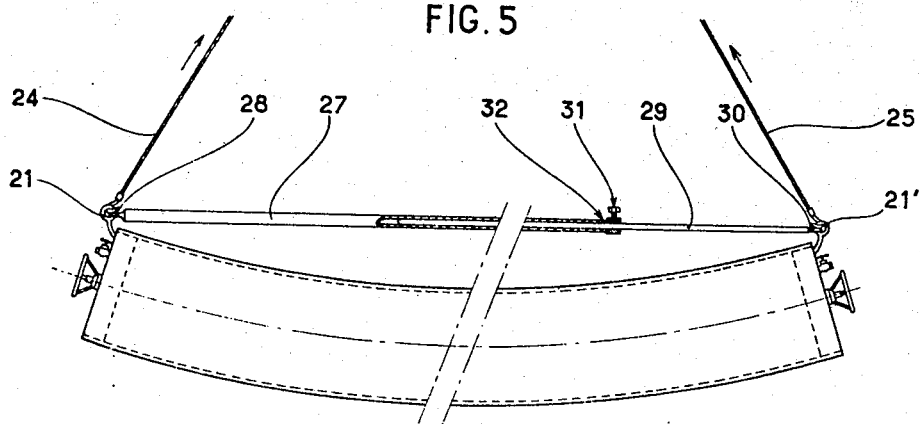

FIG. 6 represents a spacing system adjustable to the convenient length, the ends 28 and 30 of which are connected to lifting rings 21 and 21' to which are also attached the ends 24 and 25 of pulling cables when the pipe made plastic is ready for bending.

The spacing system is essentially constituted by a metal tube 27 in which a rigid metal rod 29 slides with easy fit. The free end of tube 27 is provided with a fixation system 28 to be attached to pulling ring 21. The free end of rod 29 has a similar system 30 to be fixed to pulling ring 21'. The length of rod 29 which penetrates into tube 27 during the bending operation is limited by fixing at the convenient point of rod 29 a clamping nut which makes a stop onto the end of tube 27.

The spacing system being placed on pulling rings of the heated pipe and after fixing the clamping nut to the desired place, the operation of bending is carried out very rapidly by a rapid traction of the cables up to the stop of spacing system to its minimum length.

The bending being effected, the sealing joints are removed from the bent and rigid pipe after expansion by opening valves 22, withdrawing of anchor-system by ro-inner tube 18 by opening valves 19. In some cases it is then necessary to remove the terminal parts of the pipe damaged by the lugs of anchor-systems before the pipe bent according to the invention can be used.

What is claimed is:

1. A process for bending at the site preformed pipes of non-hygroscopic and normally rigid thermoplastic organic material of a size suitable for transporting water to hydroelectric pools, comprising sealing both ends of the pipe to be bent with removable tight sealing joints, said pipe containing substantially only gas therein; heating the tubular element so-obtained uniformly through the whole of the length-to-be-curved to the plastic state, thereby creating an autogeneous pressure in the pipe; suspending from above and pulling at least one end of the pipe in the heated plastic state in the vertical plane of symmetry of the pipe to the length of geometric chord corresponding to the desired bend, said pipe being substantially unconfined during said bending step, and the vertical component of the pulling force being less than the weight of the tubular element, the autogeneous pressure maintained in the pipe during the bending thereof preventing pleating on the internal curvature of the pipe and resulting in a uniform bend; then cooling the bent pipe under tension until it recovers its normal rigidity, and then laying said pipe on the site.

2. A process according to claim 1 in which after heating of the tubular element but before bending, the length of the geometric chord is fixed to the value corresponding to the desired final curve.

3. A process as defined by claim 1 wherein the two sealing joints are each provided with peripheral inflatable means, a retractable system for anchoring in the inner wall of the pipe and a pulling ring, with at least one of the two joints being provided with means for regulating the internal pressure of the sealed and heated pipe.

4. A process according to claim 3 wherein adjustable spacing means is fixed to the rings provided on the sealing joints placed on the pipe.

5. A process as defined by claim 1 wherein said thermoplastic material is polyvinyl chloride or polyethylene.

6. A process as defined by claim 5 wherein the cross section of the pipe is about 200–550 square millimeters.

7. A process as defined by claim 1, both ends of said pipe being vertically suspended during the bending of the tubular element.

8. A process as defined by claim 1, said desired bend being adjusted in profile conformity with ground wherein said pipe is to be laid.

References Cited
UNITED STATES PATENTS

| | | | |
|---|---|---|---|
| 1,877,629 | 9/1932 | Replogle | 264—94 |
| 2,389,038 | 11/1945 | German | 264—Dig. 66 |
| 1,877,628 | 9/1932 | Replogle | 264—322 X |
| 2,964,796 | 12/1960 | Press | 264—94 X |
| 3,066,376 | 12/1962 | Pennell | 264—313 |
| 220,536 | 10/1919 | Hyde | 264—339 |
| 3,608,017 | 9/1971 | Cines | 264—94 |

ROBERT F. WHITE, Primary Examiner

T. P. PAVELKO, Assistant Examiner

U.S. Cl. X.R.

264—89, 94, 322, 339